Figure 1:
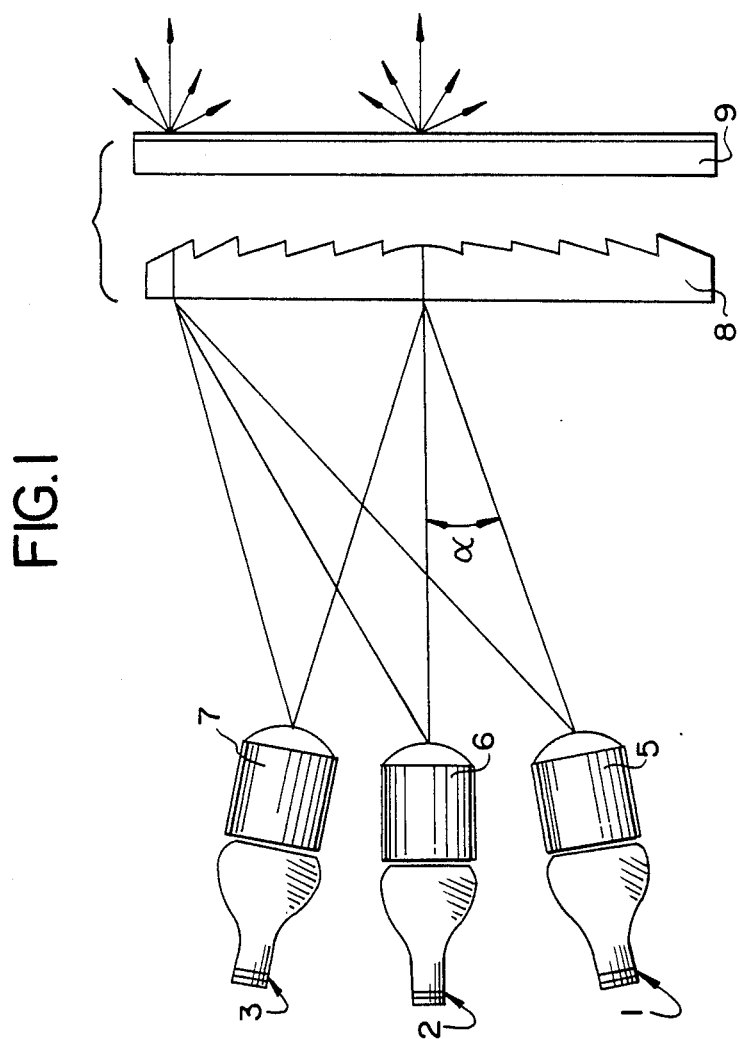

United States Patent [19]
Clausen et al.

[11] Patent Number: 4,979,800
[45] Date of Patent: Dec. 25, 1990

[54] REAR-PROJECTION SCREEN

[75] Inventors: Johannes Clausen, Charlottenlund; Erik Clausen, Gentofte, both of Denmark

[73] Assignee: Dai Nippon Printing Co., Ltd., Tokyo, Japan

[21] Appl. No.: 352,329

[22] Filed: May 16, 1989

[30] Foreign Application Priority Data

Sep. 28, 1988 [DK] Denmark .............................. 5413/88

[51] Int. Cl.$^5$ .............................................. G03B 21/60
[52] U.S. Cl. .................................................... 350/128
[58] Field of Search ................................. 350/127–129

[56] References Cited

U.S. PATENT DOCUMENTS 4,509,822  4/1985  Clausen et al. ...................... 350/128

FOREIGN PATENT DOCUMENTS

1585/82  4/1982  Denmark .
2090/83  5/1983  Denmark .

Primary Examiner—Richard A. Wintercorn
Attorney, Agent, or Firm—Larson and Taylor

[57] ABSTRACT

A transparent, rear-light projection screen that has lenses on its back side facing the projectors for paralleling light from the projectors. The screen on its front side has upright, forerunning asymmetric cylinder lenses with partially reflecting projections having light-refractive surfaces, facing outwardly from the front side and opposite to the direction from which the paralleled light originates from behind. The projection screen improves the color contrast and increases the projected light when the screen is viewed from a side direction.

21 Claims, 8 Drawing Sheets

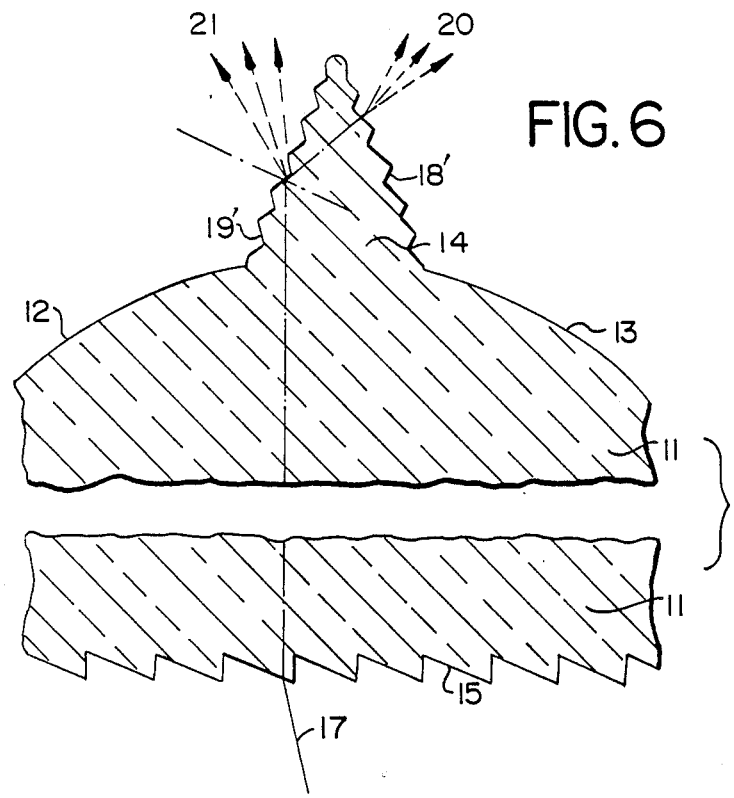
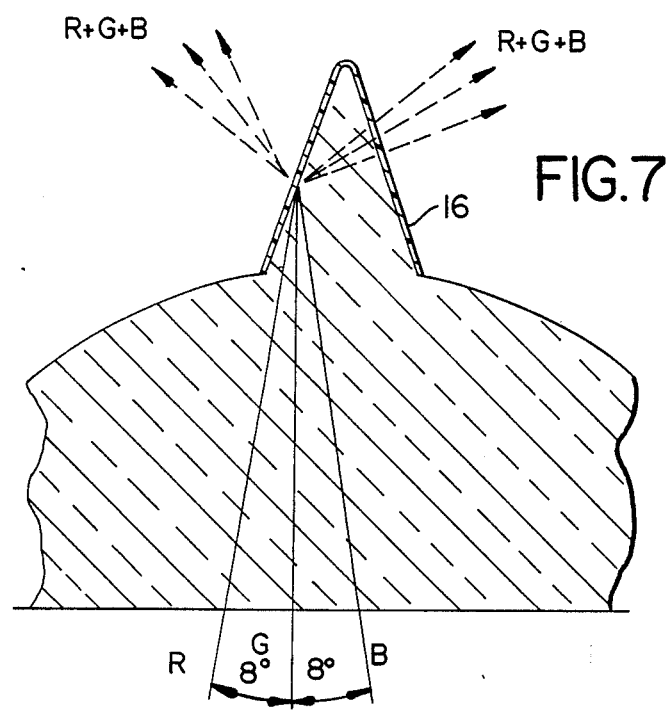

REAR-PROJECTION SCREEN

The present invention covers a rear-projection screen, provided with a lens system for paralleling of light coming from behind and having on its frontside, in the screen's user position, vertical upright forerunning lenses, the sides of which are at a small inclination compared to the screen's normal and along at least part of their width are half-reflecting to light coming from behind, between which the half-reflecting lenses, further lenses are placed.

Rear-projection screens have to a great extent been used for video-projection devices, micro film readers, data machines and flight simulators.

Screens of this kind are known from Danish Applications No. 2090/83 and No. 1585/82.

According to the known technique, the reflecting lenses have been designed so that they are total reflecting, i.e. the light from the light source—after having been paralleled—strikes the inside of the screen's vertical running lenses, as normal to the screen's surface and is then reflected out through the tops/sides of the lenses concerned.

The purpose of the present invention is to overcome the so-called color shadow problem that exists in recognized designs. Another purpose of the present invention is to prevent inconvenient reflection from the screen's outside (front side).

It is known to produce a projected TV-picture by turning three projectors, each of them with their own color (red, green and blue), towards a transparent projection screen.

The three projectors are usually positioned next to each other horizontally, and the forwarded, enlarged picture is projected onto the transparent screen. Because the three projectors are placed next to each other, their optical axes form angles with each other. Normally the optical axes form angles with each other from 7° to 12° depending on the size of the picture tube and the distance from picture tube to transmission screen.

Most designers of projection-TV place the green picture tube between the red and the blue so that the optical axis of the green picture is projected perpendicular to the transmitting screen. This has the effect that the optical axes of the blue and the red picture tube deviate with e.g. 9° from the optical axis of the green picture tube.

If, on the concerned TV a plain mat screen is applied, an observer watching the screen slantwise from the front will see a picture which is either blue or green dominant, depending on whether the observer is closer to the optical axis for the projector giving a red or a blue picture. In English this problem is called "color shadow" or in Danish color shading.

The purpose of the present invention is to remove the color shadow problem for an observer watching the picture within approx. ±30° horizontal in comparison to normal to the screen, i.e. within the horizon where the transmitting cylinder lens operates.

By coating the surface of the total reflecting lens with a special lacquer, it is possible to make the sides of the lens half reflecting so that light beams striking the coated sides of the lens will part evenly and then be spread ±10° within the coated layer. I.e. 50% of the light striking the coated surface will be spread within a visual field of ±10° between the screen's normal and the normal to the concerned coated len's normal.

By applying to the sides of the otherwise totally reflecting lens a special coating and making these half reflecting, the color shadow problem will be eliminated, because the coating of the lens concerned will spread the light in such a way that the light beams from the three sources of light will overlap each other within e.g. ±10°. The coating thus has the effect that a light beam, striking the half-reflecting coated surface, will be spread ±10°, but in such a way that all vectors within ±10° have the same length spatially, i.e. an observer will see the light from the three sources of light blend together and thereby form an expected picture.

The above-mentioned half-reflecting lenses have oblique sides and it is the sides, that have been applied the coating, which gives the desired spreading of the light.

A screen of the above-mentioned type can consist of a number of half reflecting lens tops, the type being measured at the acute angle, and the sides being adjacent to a cut of half a cylinder lens.

Figure 2:
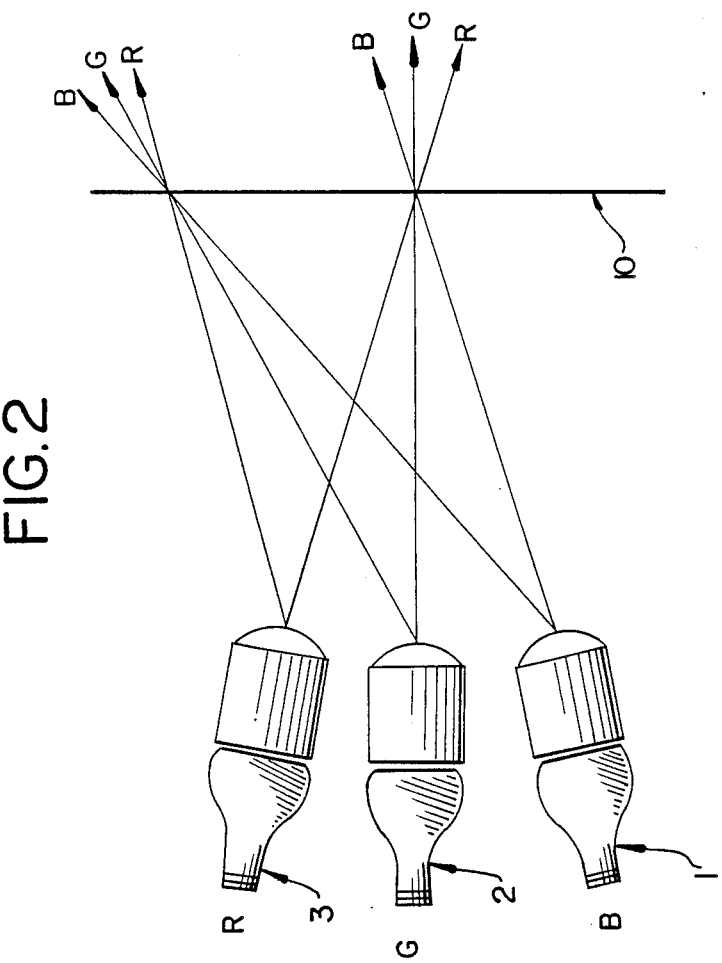
Figure 3:
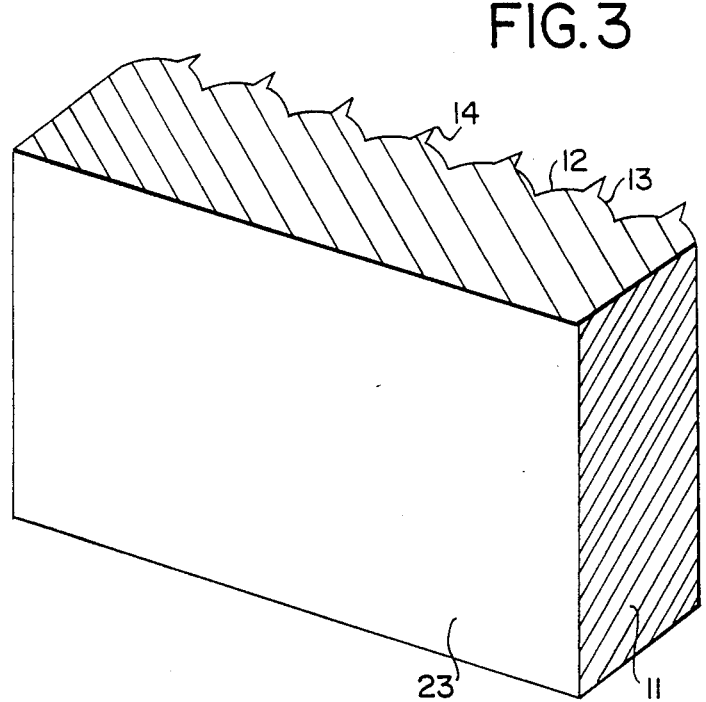
Figure 4:
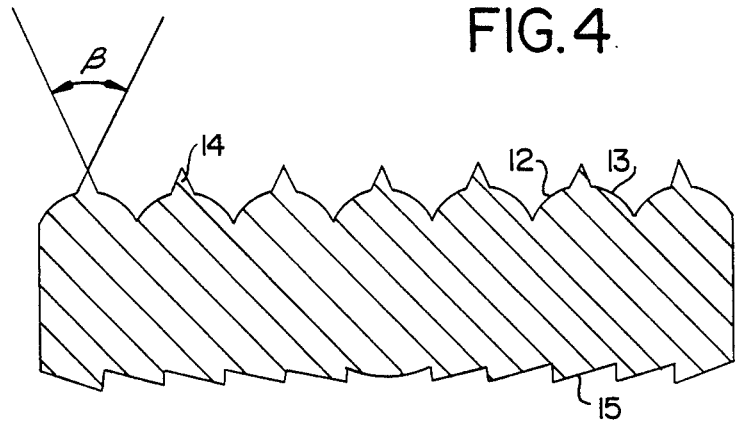
Figure 5:
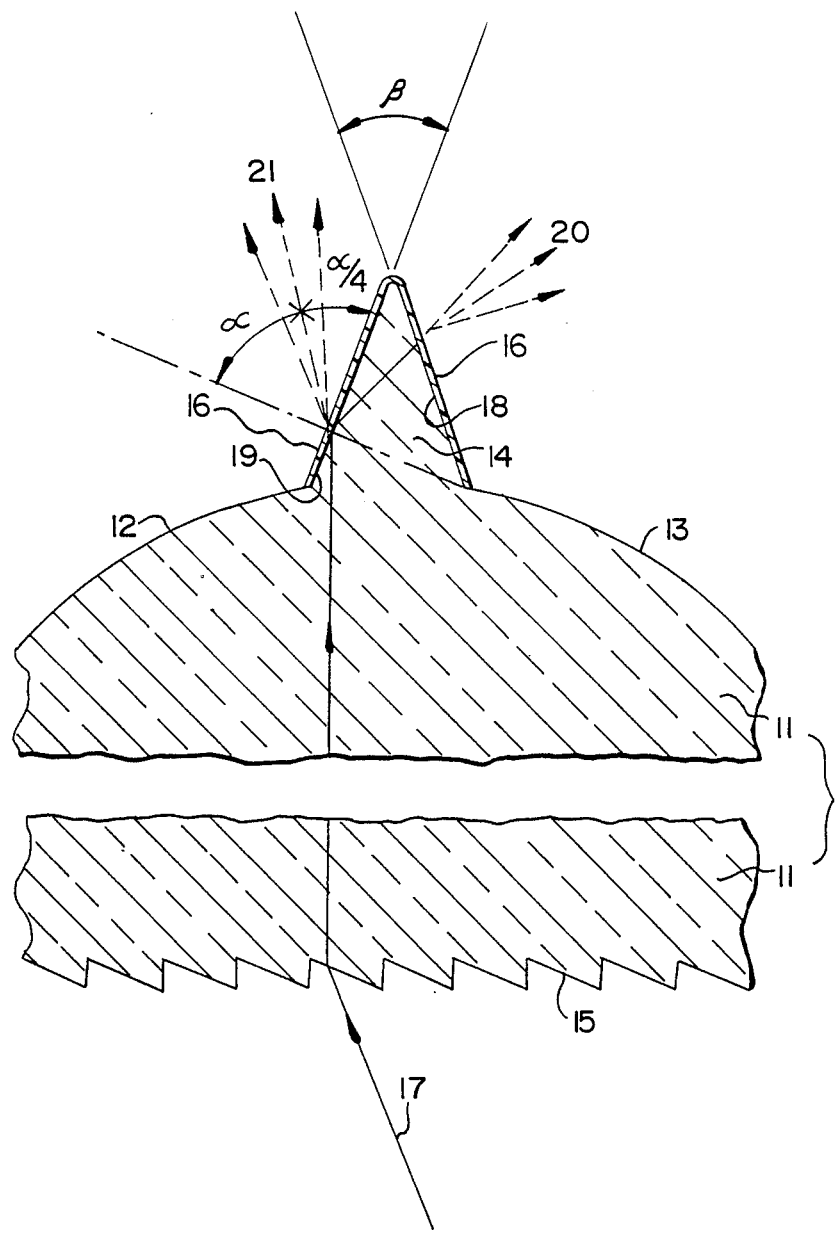
Figure 8:
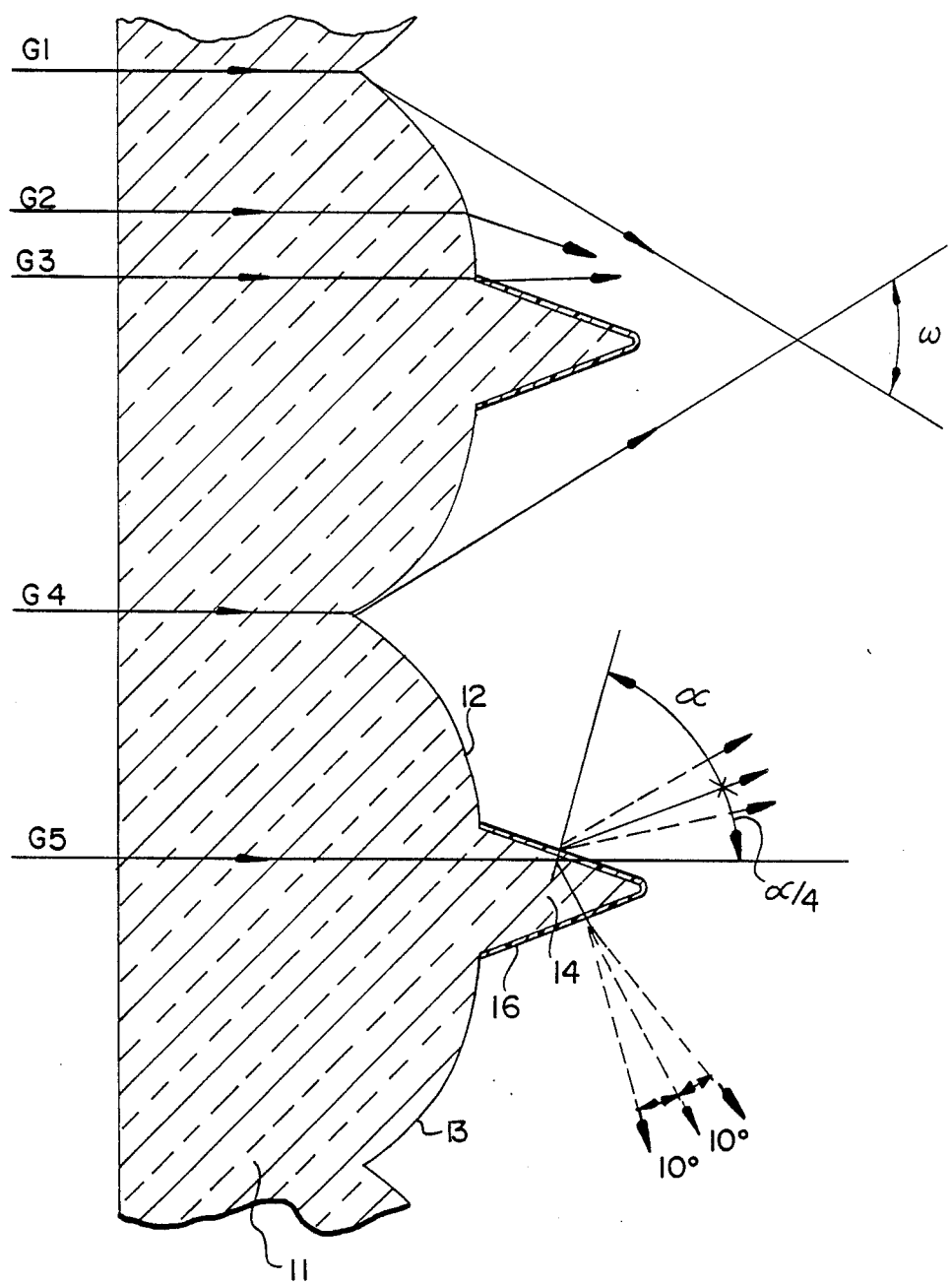

The invention will be explained more in detail with reference to the drawings, where:

FIG. 1 shows a picture of a rear-projection screen with a surface provided with lenses for illumination and application of projection screens of the type mentioned here, FIG. 2 shows a visually enhanced screen, which maybe a simple mat screen or micro film screen, FIG. 3 shows a perspective view of an embodiment for the screen, according to the invention, FIG. 4 shows a cross-sectional view of an embodiment in which a Fresnel lens is designed on the projection surface of the rear-projection screen shown in FIG. 3, FIG. 5 shows a cross-sectional view of the screen's half reflecting lenses, FIG. 6 shows a cross-sectional view of an embodiment, where the sides are irregular or waving, FIG. 7 shows the path of rays for red and blue light for the half reflecting lens shown in FIG. 4, FIG. 8 shows a diagram explaining the light beams' passage for the embodiment shown in FIG. 3, FIGS. 9, 10 and 11 show drawings corresponding to FIG. 3, for illustration of different modified embodiments for the screen, according to the invention.

FIG. 1 shows how the three projectors 1, 2 and 3 project TV-pictures towards the rear side of a projection screen, 8 and 9. Each projector emits green, red and blue light respectively. The three projectors are placed next to each other horizontally, so that projector 2, most often the green projector, has its optical axis perpendicular on the screen 8 and 9.

The optical axes of the projectors 1 and 3 often form an angle of 6°-10° in comparison to projector 2.

By means of the three projectors 1, 2 and 3, as well as the lenses 5, 6 and 7 mounted in front, it is possible to form—proportional to the projectors—an enlarged picture on the screen 8 and 9.

Screen 10 shown on FIG. 2 is a simple mat screen, e.g. mat glass or a micro film screen without incorporated lenses. Standing to the right or to the left of the screen's center line, the observer will see a red a blue dominating picture, respectively depending on whether the observer is closer to the red or the blue projector's optical axis. An observer being to one side of the center line of the screen will see the screen red dominating on the right side, if this side has the red projector's optical axis to the right of the screen's center line etc.

It is this color distortion, for an observer watching the picture from the front, that this present invention is aimed at correcting.

FIG. 3 shows an embodiment in perspective for the screen, according to the invention, where 11 indicates the screen's basic material, e.g. acrylic. The front side of the screen is provided with two types of upright lenses, 12, 13 and 14.

FIG. 4 shows an embodiment where the side, turning towards the projectors 1, 2 and 3, is designed as a Fresnel lens 15 for paralleling of the light, so that the light strikes the front side as normal to the surface.

In order to further explain the invention, a cut or cross-sectional view of the lens 14 from FIG. 4 is shown in FIG. 5. The light beam 17 from the projectors is being aligned by the Fresnel lens 15 so that it strikes the sides 18 and 19 of the front side lens 14 at an acute angle. In order to obtain the desired deflection of the light beam 17, lens 14's sides 18 and 19 are coated with a layer 16 of lacquer with a refractive index equal to or higher than the basic material 11 and a lacquer layer thickness of 2–3μ. Wax has furthermore been added to the lacquer in order to achieve the desired diffusion of the light within a deflection area of ±10°. As can be seen from FIG. 5, the light beam 17 is separated into two vector crowds 20 and 21 after having passed through coated layers 16 on sides 18 and 19. It is furthermore evident that the vector crowd 21 is deflected in a ratio where the angle to the normal is $\alpha$, while the angle between the vector crowd and the screen usually is $\alpha/4$. In order to make sure that the angle $\alpha/4 = 15°$, the angle $\beta$ must be more than 30°, but less than 43°, preferably 37°, entirely depending on the applied lacquer's index of refraction and its dulling medium. The vector crowd 21 will thus neutralize the change of color within a bow line of ±15° compared to normal.

FIG. 6 further shows an embodiment where the lens 14's sides 18' and 19' have been made irregular or have a sinusoidal surface. The distance of the wavelength however should not exceed 3× the mean value for the applied light's wavelength.

FIG. 7 shows the path of rays for two outer projectors, red and blue respectively. The projectors have in FIG. 7 a mutual angle of 16° between their optical axes. When the rays have passed the coated layer (film), the red and the blue ray are mixed.

In FIG. 8 a division of the path of rays for green light through the upright lenses 12, 13 and 14 has been made. As can be seen in FIG. 8, the ray $G_3$ will not be deflected, because the surface, where the ray leaves the acrylic, is at a right angle to the normal of the surface. However, the rays $G_1$, $G_2$ and $G_4$ will undergo a deflection in accordance with index of refraction for the concerned screen material 11. When the basic material 11 is acrylic, the deflection does not exceed ±30. If the radius of curvature for the lenses 12, 13 is enlarged further, these lenses will involve total reflection. The path of rays in lens 14 has previously been described, and it is evident on FIG. 8 that the lenses 12, 13 and 14 will supplement each other in such a manner that the viewing angle will be approx. 150°.

Figure 9:
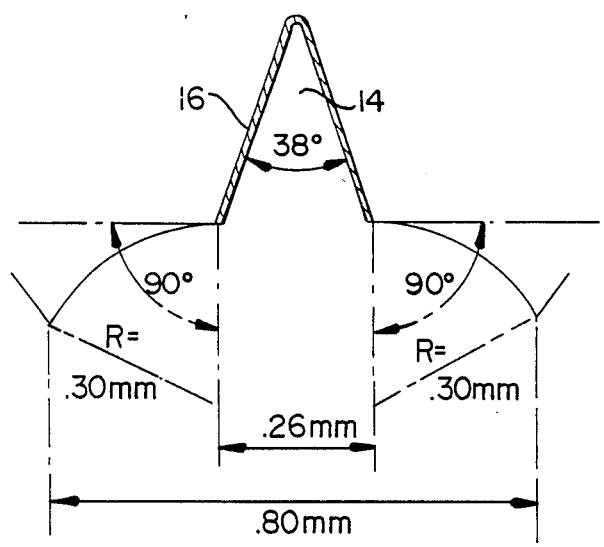
Figure 10:
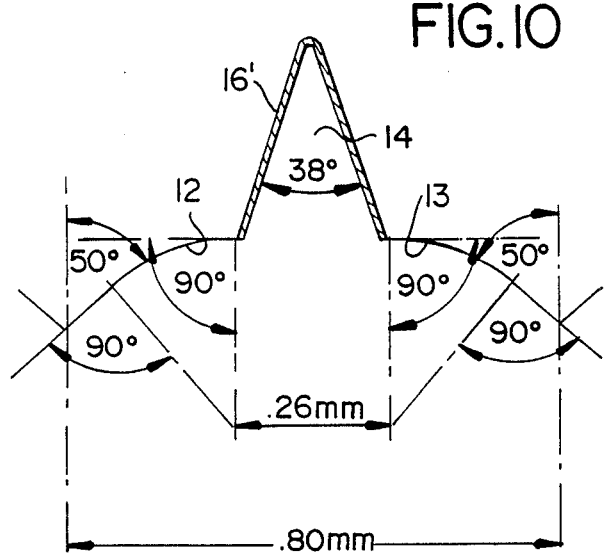
Figure 11:
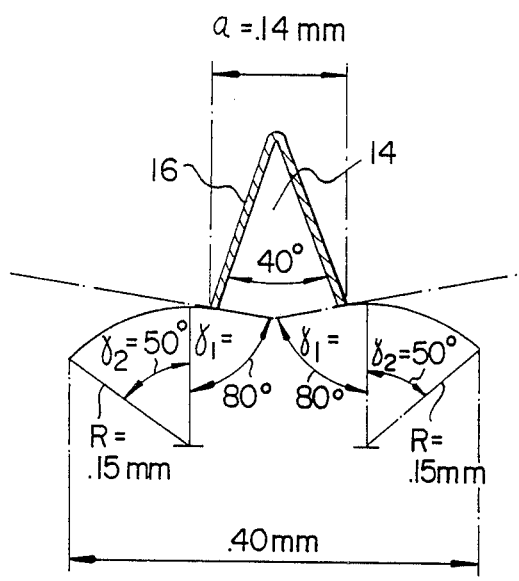

FIGS. 9, 10 and 11 show practical examples of rear projection screens according to the present invention.

EXAMPLE 1

By means of a tool with a profile as illustrated in FIG. 9, a 3 mm thick plate of PMMA with 20 g $SiO_2$ per $m^2$ and with a grain size of 5–35μ was cast. The classification distance between the tops of the lenses 14 was 0.80 mm. Radius of curvature for the lenses 12 and 13 was 0.30 mm, the angle $\beta$ was 36°. Moreover, the distance between the lens 14's sides, where these meet radius of curvature for 12 and 13, was 0.26 mm. Further, the angle—between radius and the tangent for the lenses 12 and 13, where these meet lens 14—was 90°. After being cast, the screen was coated with a layer 16 of lacquer, having a index of refraction of 1.50; and 25 g wax as well as 15 g $CaCo_3$ per liter of lacquer were added.

The screen showed the following parameters:
Peak gain: 5.6
½ horizontal peak gain: 38°
½ vertical peak gain: 7.5°.

Peak gain means the direct transparent light measured as normal to the surface in comparison to a known reference.

The screen showed good efficiency so that the picture was made visible over a wide visual angle, considerably exceeding ±75°. Further the screen showed an extremely good color uniformity.

EXAMPLE 2

In this example the design as illustrated in FIG. 10 was applied, showing that the lenses 12 and 13 are not an entire sector of a circle, but both have surfaces, where these meet each other. This design is suitable for projection-TV in particular, where the optical axes between the projectors differ more than 8°. Process of manufacture was very much identical to the one mentioned under example 1.

The following parameters were measured:
Peak gain: 5.8
½ horizontal peak gain: 36°
½ vertical peak gain: 8°.

In order to further increase the diffusion of the light in both vertical and horizontal direction for rear projection screens, it is advisable to add a diffusing medium 16'. Such a medium could e.g. be $SiO_2$, $CaCo_3$ $BASO_4$ as well as fine powdered glass with an index of refraction 0.05–0.07 larger or smaller than the basic material, which could be acrylic with index of refraction 1.49.

It is not decisive for the invention where the refractive material is being placed on the screen, or whether it is placed in a well-defined layer.

EXAMPLE 3

In FIG. 11 is shown a design with the following specifications: lens 14, 40° angle; $\gamma_1 = 80°$, $R = 0.15$ mm. Division space = 0.40 mm $\gamma_2 = 50°$ $\alpha = 0.14$ mm. The significant modification in this design, compared to previous examples, is the modification of the angle $\gamma$ from 90° to 80°. This modification will subdue the direct transparent light, i.e. light within a measuring bow of ±8, so that the screen will now have a lower peak gain, but a more even distribution of light.

The screen indicated the following values:
Peak gain: 4.2
½ horizontal peak gain: 36°
½ vertical peak gain: 8°.

This screen showed the best color purity of all 3 examples.

We claim:

1. A transparent rear-projection screen having a rear side comprising lenses for paralleling light coming from behind the screen, and having a front side comprising rectilinear, convex lenses wherein at essentially a midpoint of a plurality of adjacent convex lenses, projections are provided each of which projections has opposite side surfaces provided with light diffusing means for diffusing light incident thereto.

2. A screen according to claim 1, wherein the projections are in the form of lenses having essentially a triangular cross-section and the projections are connected by asymmetric, convex lenses.

3. A screen according to claim 1, wherein an angle between a tangent of the convex lenses and a radius of said convex lens is 80° at a point at which the projections are connected to the convex lenses.

4. A screen according to claim 1, wherein the light diffusing means is produced by a lacquer-coating mixed with wax and $CaCO_3$, where said wax and $CaCO_3$ have an index of refraction of from 0.02 to 0.06.

5. A screen according to claim 1, comprising a light refracting medium containing an organic or inorganic pigment evenly distributed in a cross-section of the entire medium, or in one of the sides of the screen.

6. A screen according to claim 1, wherein the rear side of the screen comprises lenses for diffusion of the light vertically.

7. A transparent rear-projection screen having a rear side and a front side, wherein said rear side comprises lenses for paralleling light received by the rear side of the screen, and the front side comprises rectilinear, convex lenses having projections at about a mid-point of adjacent convex lenses, each of the projections having opposite side surfaces provided with light diffusing means for diffusing light incident thereto.

8. A screen according to claim 7, wherein the lenses on the rear side comprise Fresnel lens.

9. A screen according to claim 8, wherein the light diffusing means is a coating for deflecting light striking said sides from within said mid-point projections and diffusing the light passing through the sides of said mid-point projections.

10. A screen according to claim 9, wherein said coating comprises a thickness of from 1 to 3 microns.

11. A screen according to claim 9, wherein said coating comprises a layer of lacquer having a refractive index equal to or greater than a refractive index of a basic material of said screen.

12. A screen according to claim 9, wherein said coating has a predetermined amount of wax added to the lacquer to achieve a desired diffusion of light from the sides of the projections within a predetermined area of deflection.

13. A screen according to claim 9, wherein the sides of projections are planar and form a predetermined angle with one another.

14. A screen according to claim 9, wherein the sides of the projections have a non-planar, wavey surface that form a predetermined angle with one another.

15. A transparent rear-projection screen having a rear side comprising lenses for paralleling light coming from behind the screen, and having a front side comprising a plurality of convex lenses positioned one next to the other in a rectilinear manner, each convex lens comprising:

(a) a first convex lens surface having a low end attached to an adjacent convex lens, and a high end attached to a base of a mid-point lens projection, and (b) a second convex lens surface having a low end attached to an adjacent convex lens and a high end attached to a base of a mid projection lens, and (c) a mid-lens projection having a base attached to the high side of said first convex lens and the high side of said second convex lens, wherein said first convex lens and said second convex lens are symmetrical with respect to said mid-lens projection.

16. A screen according to claim 15, wherein said mid-lens projection has substantially a triangular cross-section pointing outwardly from the front side of the screen with sides that are partially reflecting and have a light-refracting surface, where an extension of said sides forms a predetermined angle $\beta$.

17. A screen according to claim 16, wherein said first convex lens surface and said second convex lens surface each have a predetermined radius of curvature R, said mid-lens projection has a predetermined base width W, and said convex lens has a predetermined diameter D, and said sides of said mid-lens projection form an angle $\beta$ with one another.

18. A screen according to claim 17, wherein a tangent to a point where the first convex lens makes contact with the base of mid-lens projection forms an angle $\gamma$ with a normal to a surface of the screen front side, and wherein elements of the screen have substantially the following dimensions:

Gamma = 80°
Beta = 40°
W = 0.14 mm
D = 0.40 mm
R = 0.15 mm.

19. A screen according to claim 16, wherein said sides have a coating comprising a lacquer having an index of refraction of approximately 1.50 to which has been added predetermined amounts of wax and $CaCO_3$.

20. A screen according to claim 15, wherein the rear projection screen is made of a basic material containing a diffusing medium, said diffusing medium comprising a fine-powdered glass or one of the compounds from the group of $SiO_2$, $CaCO_3$ or $BaSO_4$, said diffusing medium having an index of refraction of from 0.05 to 0.07 larger or smaller than an index of refraction of the basic material of the screen.

21. A screen according to claim 20, wherein said basic material is acrylic.

* * * * *